(12) United States Patent
Lu

(10) Patent No.: US 11,609,647 B1
(45) Date of Patent: Mar. 21, 2023

(54) MOUSE DEVICE AND METHOD FOR ASSEMBLING AND ADJUSTING THE SAME

(71) Applicant: DEXIN CORPORATION, New Taipei (TW)

(72) Inventor: Ho-Lung Lu, New Taipei (TW)

(73) Assignee: DEXIN CORPORATION, New Taipei (TW)

( * ) Notice: Subject to any disclaimer, the term of this patent is extended or adjusted under 35 U.S.C. 154(b) by 0 days.

(21) Appl. No.: 17/879,743

(22) Filed: Aug. 2, 2022

(30) Foreign Application Priority Data

Dec. 30, 2021 (TW) .................................. 110149515

(51) Int. Cl.
*G06F 3/0354* (2013.01)

(52) U.S. Cl.
CPC .................................. *G06F 3/03543* (2013.01)

(58) Field of Classification Search
CPC .................................................. G06F 3/03543
USPC .......................................................... 345/163
See application file for complete search history.

(56) References Cited

U.S. PATENT DOCUMENTS

| 3,510,620 | A | * | 5/1970 | Smith | ...................... | B23H 7/18 |
| | | | | | | 219/69.16 |
| 2007/0251810 | A1 | * | 11/2007 | Corcoran | ............ | G06F 3/03543 |
| | | | | | | 200/276.1 |

* cited by examiner

*Primary Examiner* — Mark Edwards
(74) *Attorney, Agent, or Firm* — Li & Cai Intellectual Property Office

(57) ABSTRACT

A mouse device and a method for assembling and adjusting the same are provided. The mouse device includes an upper housing that includes a button, a middle housing, a bottom housing, a retaining bracket, a sensing switch module, and an adjusting screw. The middle housing is disposed between the upper housing and the bottom housing. The retaining bracket is disposed under the middle housing, and includes a frame and a suspended arm. A fixed end of the suspended arm is fixedly connected to one side of the frame. The sensing switch module is disposed on the suspended arm and corresponds in position to the button. The adjusting screw is disposed at another side of the frame, and is used to adjust a distance between the button and the sensing switch module. The adjusting screw is shielded by the bottom housing and is not exposed from the bottom housing.

10 Claims, 7 Drawing Sheets

MOUSE DEVICE AND METHOD FOR ASSEMBLING AND ADJUSTING THE SAME

CROSS-REFERENCE TO RELATED PATENT APPLICATION

This application claims the benefit of priority to Taiwan Patent Application No. 110149515, filed on Dec. 30, 2021. The entire content of the above-identified application is incorporated herein by reference.

Some references, which may include patents, patent applications, and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a mouse device and a method for assembling and adjusting the same, and more particularly to a mouse device that can be used to control a cursor of a computer or other operating functions and a method for assembling and adjusting the same.

BACKGROUND OF THE DISCLOSURE

An operation feeling of a computer mouse depends on a distance from an activating portion of a button to an activating point of a micro switch (that is, a keystroke travel distance).

Conventionally, a switch module of the computer mouse has a printed circuit board and a sensing switch (otherwise referred to as a micro switch) which is soldered onto the printed circuit board. Further, the printed circuit board is fixed onto a bottom housing of the computer mouse. However, during a manufacturing process, different tolerances such as an assembling tolerance, a shaping tolerance of the bottom housing, a soldering tolerance of the micro switch, and a thickness tolerance of the printed circuit board can affect the distance between the activating portion of the button and the activating point of the micro switch, so that said distance fails to conform with an originally designed distance. As a result, an improved and consistent operation feeling cannot be provided.

To address the above problems, the applicant of the present disclosure has filed a U.S. Pat. No. 10,216,291 B1 "Mouse device", in which the switch module is suspended and mounted on an inner side of an upper housing. The printed circuit board of the switch module is screwed to a suspended post of the upper housing through an adjusting screw, and the micro switch is aligned with the activating portion of the button. The tolerances can be eliminated by fine adjustment of the adjusting screw. Such a design is capable of eliminating multiple tolerances. However, there are still other elements that are disposed on the printed circuit board, such as an optical element. When the position of the printed circuit board is being adjusted, these other elements may be moved and result in other tolerances. In addition, this suspended configuration of the switch module causes a greater rigidity.

In addition, Taiwan Patent No. M588279U discloses a computer mouse and an adjusting mechanism of a button thereof. The printed circuit board in this patent has a fixed end and a free end that is opposite to the fixed end. The fixed end is fixed to a housing. The micro switch is disposed on the printed circuit board, and is arranged between the fixed end and the free end. The button is disposed on a first opening, and is aligned with the micro switch. A height adjusting device is disposed in the housing and protrudes from a second opening. The height adjusting device is used to move the free end upward and downward. However, such an adjustment structure needs an opening formed on the bottom housing, which is labor-consuming and not aesthetically pleasing. During a process of moving the free end of the printed circuit board, tolerances of other elements may occur.

In Taiwan Patent No. M450771, a mouse apparatus with an adjustable return spring is disclosed, which provides an upper housing, a bottom housing, and an adjusting post that pushes against and extends toward the upper housing from the bottom housing. In this way, the distance between the activating portion of the button and the micro switch can be adjusted. However, in this patent, an opening still needs to be formed on the bottom housing.

Therefore, how to enhance a process of assembling and adjusting a mouse device through an improvement in structural design, so as to overcome the above-mentioned deficiencies, has become an important issue to be solved in the field.

SUMMARY OF THE DISCLOSURE

In response to the above-referenced technical inadequacies, the present disclosure provides a mouse device and a method for assembling and adjusting the same.

In one aspect, the present disclosure provides a mouse device, which includes an upper housing, a middle housing, a bottom housing, a retaining bracket, a sensing switch module, and an adjusting screw. The upper housing includes a button. The middle housing is disposed between the upper housing and the bottom housing. The retaining bracket is disposed under the middle housing. The retaining bracket includes a frame and a suspended arm. The suspended arm has a fixed end, and the fixed end is fixedly connected to one side of the frame. The sensing switch module is disposed on the suspended arm, and is corresponded in position to the button. One part of the sensing switch module extends beyond a free end of the suspended arm. The adjusting screw is disposed at another side of the frame and is adjacent to the free end of the suspended arm. The adjusting screw is shielded by the bottom housing and is not exposed from a bottom side of the bottom housing, and the adjusting screw abuts against the sensing switch module, so as to allow for adjustment of a distance between the sensing switch module and the button.

In another aspect, the present disclosure provides a method for assembling and adjusting a mouse device, which includes steps as follows: assembling a middle housing to an upper housing, in which the upper housing includes a button; fixing a sensing switch module to a retaining bracket, in which the retaining bracket includes a frame and a suspended arm, one end of the suspended arm is connected to one side of the frame; fixing the retaining bracket to the middle housing; arranging an adjusting screw at another side of the frame; adjusting a distance between the sensing switch module and the button through the adjusting screw; and placing a bottom housing onto the middle housing, in which the adjusting screw is not exposed from the bottom housing.

Therefore, one of the beneficial effects of the present disclosure is that, in the mouse device and the method for assembling and adjusting the same provided by the present disclosure, the bottom housing is assembled after a distance between a sensing switch and an activating portion of the button is adjusted. The bottom housing does not need an opening for adjustment. In addition, a secondary circuit board is disposed at a bottom of the sensing switch, and is separate from a main circuit board (not shown). The main circuit board does not need to be moved during an adjusting process, such that displacement of other elements can be prevented.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
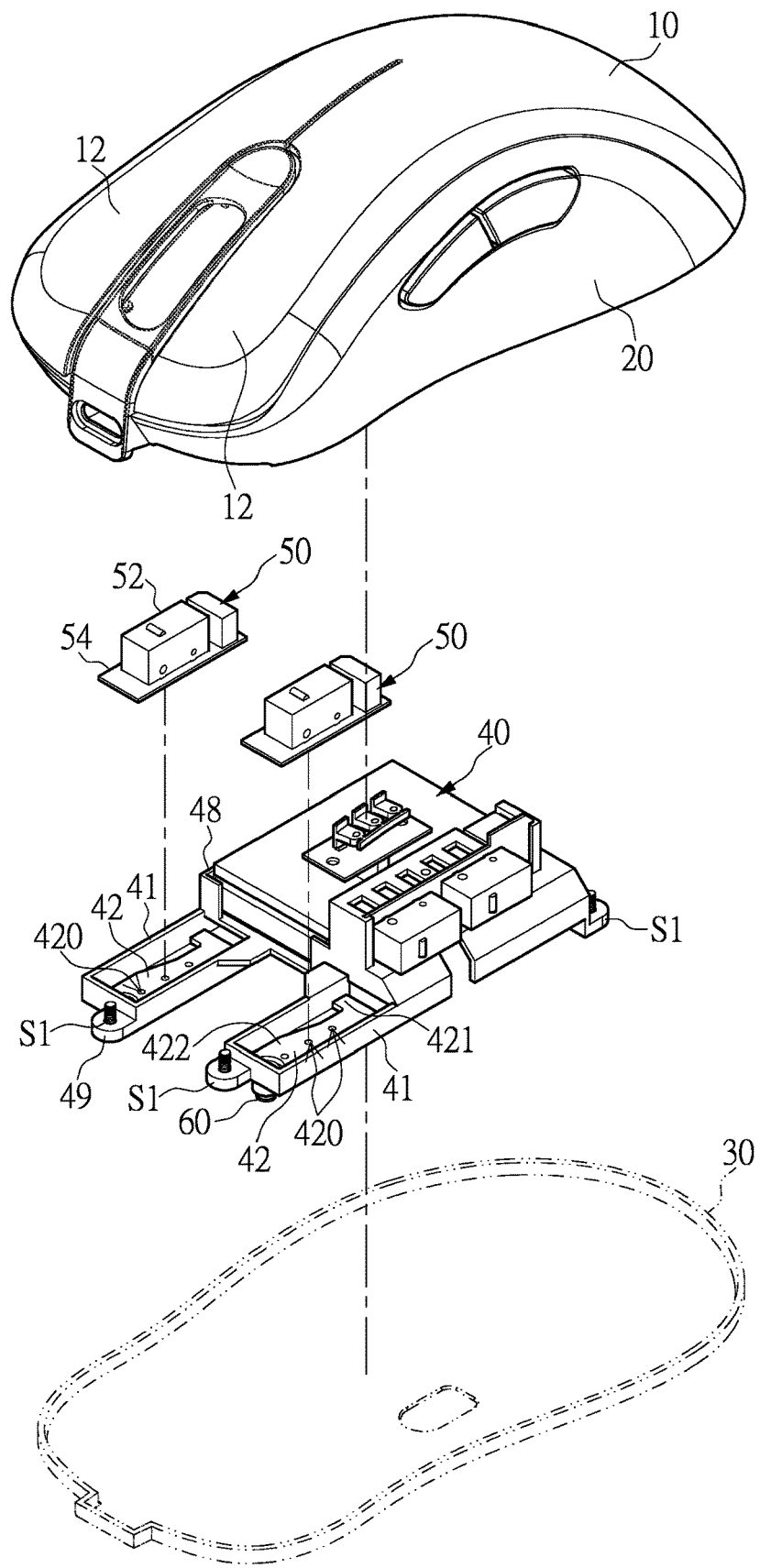
FIG. 1 is an exploded perspective view of a mouse device according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
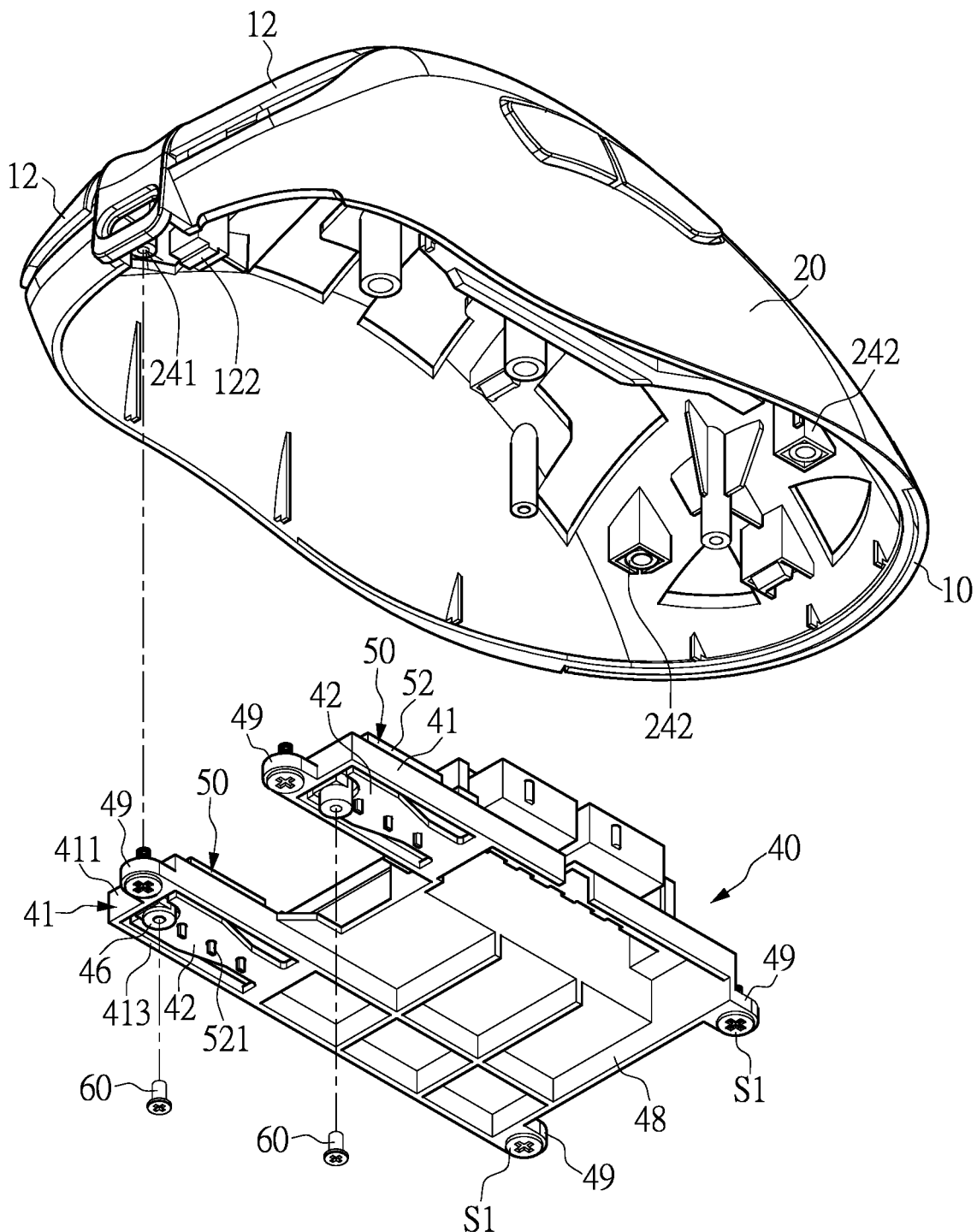
FIG. 2 is another exploded perspective view of the mouse device according to the present disclosure.

Referring to FIG. 1 and FIG. 2, one embodiment of the present disclosure provides a mouse device, which includes an upper housing 10, a middle housing 20, a bottom housing 30, a retaining bracket 40, a pair of sensing switch modules 50, and an adjusting screw 60. In this embodiment, some elements (such as a scroll wheel) are not shown in the figures for the sake of clarity.

Figure 4:
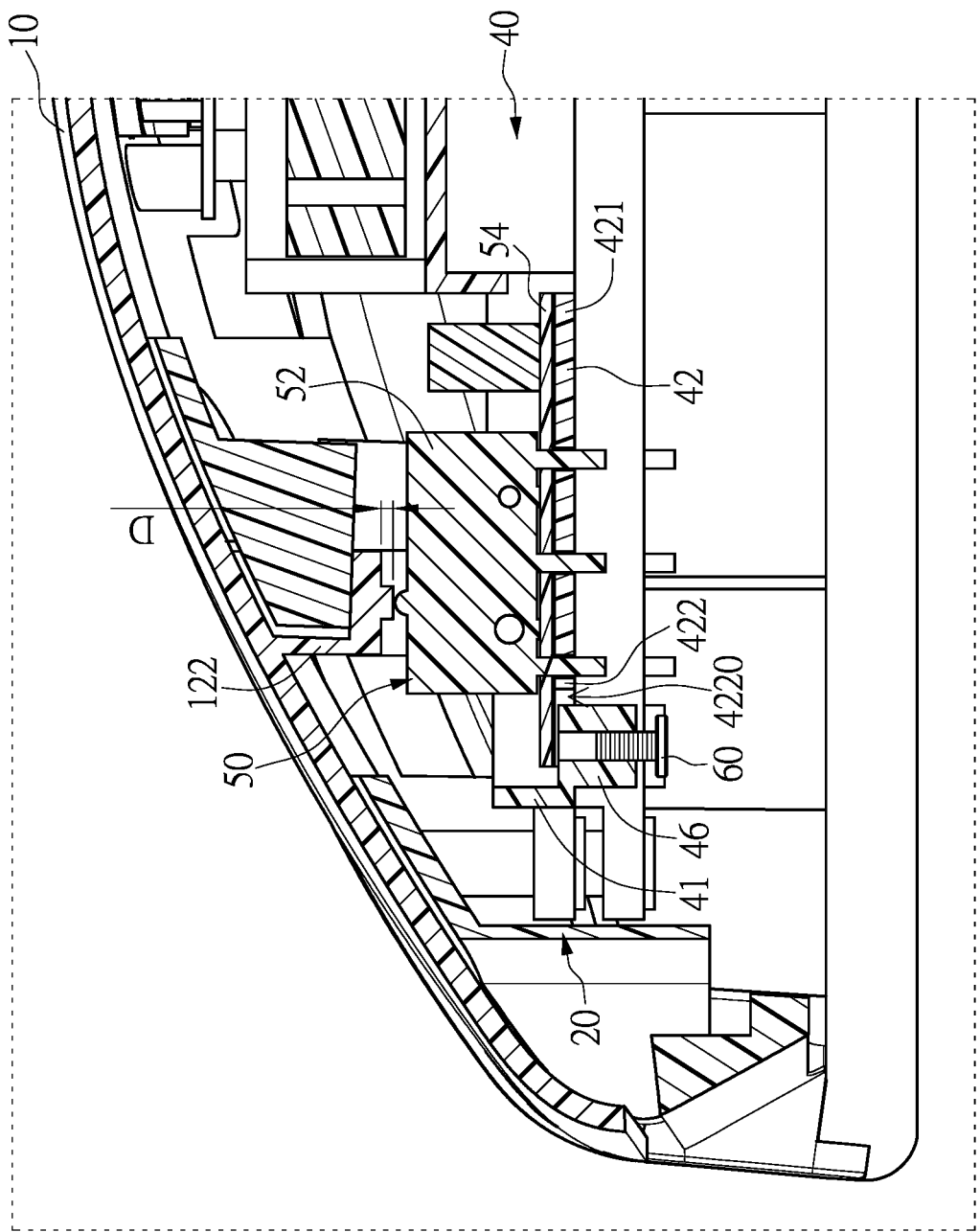
FIG. 4 is a schematic enlarged view of part IV of FIG. 3.

The upper housing 10 includes two buttons 12, and the two buttons 12 can be positioned at the same height or at different heights with consideration to ergonomic design. Each of the buttons 12 has an activating portion 122 extending downward. The activating portion 122 passes through the middle housing 20 and extends to abut against the sensing switch module 50. In the structural design of the present disclosure, a small gap (referring to a distance D as shown in FIG. 4) is reserved between the activating portion 122 and the sensing switch module 50, which is configured to adjust a manufacturing tolerance due to a deformation amount after a plastic material is shaped. During an assembling process, the activating portion 122 can accurately contact the sensing switch module 50 through a subsequent adjustment step of the present disclosure, details of which will be described later.

The middle housing 20 is disposed on a bottom surface of the upper housing 10. A keystroke travel distance is reserved between the button 12 and a top surface of the middle housing 20. The middle housing 20 is disposed between the upper housing 10 and the bottom housing 30. The middle housing 20 extends downward to have a plurality of connecting posts 241, 242 for fixing of the retaining bracket 40.

The retaining bracket 40 is disposed under the middle housing 20. The retaining bracket 40 accommodates inner elements of a computer mouse, and includes a main body 48 which is substantially rectangular-shaped. A front side of the main body 48 extends in a forward direction to form two frames 41 and two suspended arms 42. In this embodiment, the retaining bracket 40 is screwed to the connecting posts 241, 242 beneath the middle housing 20 by four screws S1. In detail, the frame 41 has a plurality of coupling threaded tubes 49. The coupling threaded tube 49 connects to an outer surface of a front wall 411 (i.e., an outer side of the two frames 41) and a rear side of the main body 48. In addition, by the screws S1, the retaining bracket 40 is connected to the middle housing 20. The suspended arm 42 is disposed in the frame 41. Each suspended arm 42 has a fixed end 421 and a free end 422. The fixed end 421 is fixedly connected to one side of the frame 41. In the present embodiment, the fixed end 421 is connected to an inner side of the frame 41. The free end 422 is close to an outer side of the frame 41. The sensing switch module 50 of the present embodiment is disposed on the suspended arm 42, and corresponds in position to the button 12. One part of the sensing switch module 50 extends beyond the free end 422 of the suspended arm 42.

One of the technical characteristics of this embodiment is that the adjusting screw 60 is disposed at another side of the frame 41, and is adjacent to the free end 422 of the suspended arm 42. The adjusting screw 60 is shielded by the bottom housing 30 and is not exposed from a bottom side of the bottom housing 30. The adjusting screw 60 abuts against the sensing switch module 50, so as to allow for adjustment of the distance D between the sensing switch module 50 and the button 12 (as shown in FIG. 4).

Figure 3:
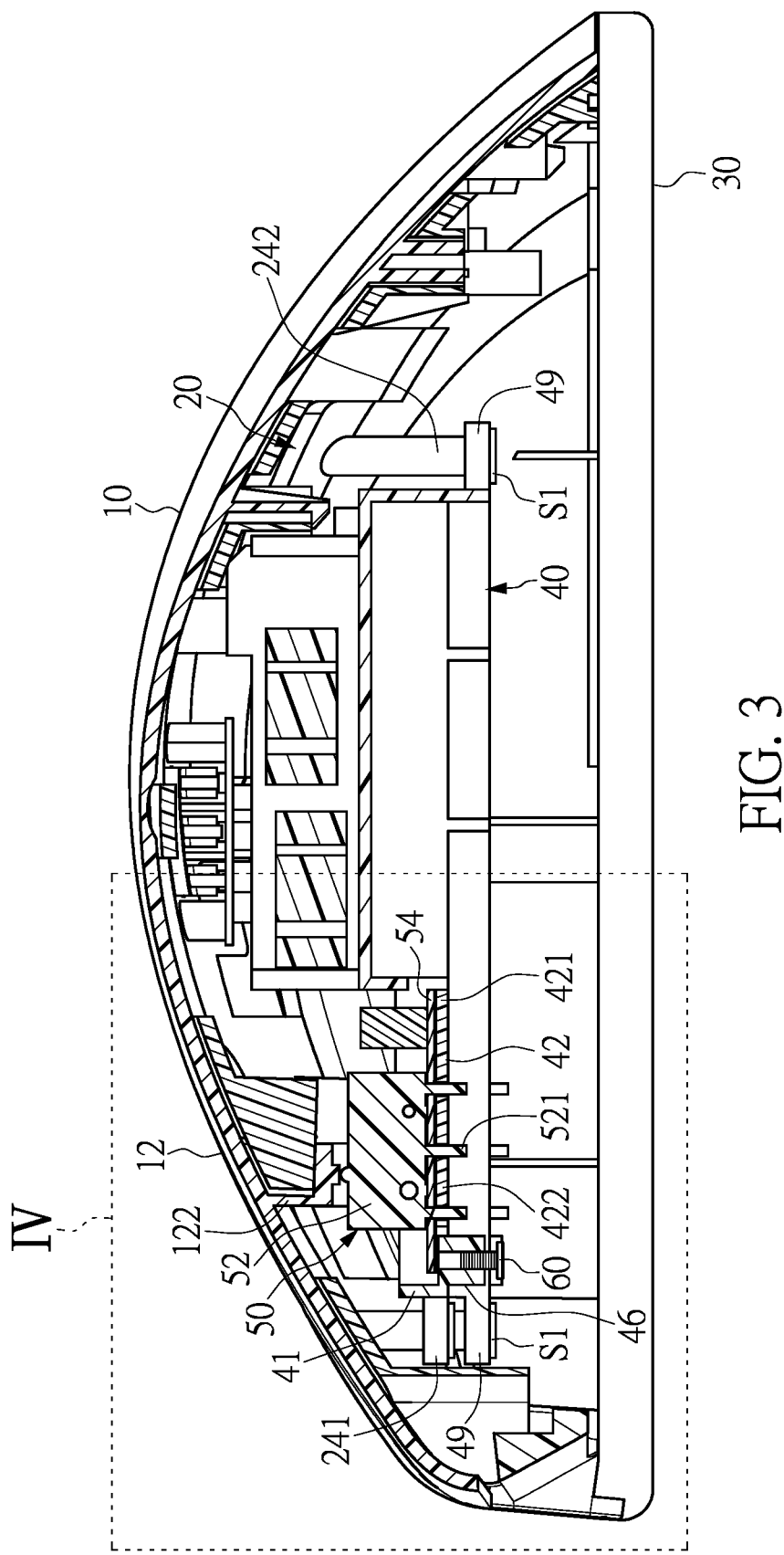
FIG. 3 is a cross-sectional view of the mouse device according to the present disclosure.

In detail, referring to FIG. 3 and FIG. 4, the retaining bracket 40 further includes a threaded tube 46, and the threaded tube 46 is connected to a bottom portion of the front wall 411 of the frame 41. The adjusting screw 60 passes through the threaded tube 46. A top surface of the threaded tube 46 is flush with a top surface of the suspended arm 42, or is lower than the top surface of the suspended arm 42. According to the above configuration, the retaining bracket 40 is used as a stable base in the present disclosure.

In this embodiment, the sensing switch module 50 includes a sensing switch 52 and a secondary circuit board 54. The sensing switch 52 is usually a micro switch, and the sensing switch 52 is disposed on the secondary circuit board 54. The secondary circuit board 54 is disposed in the frame 41. The secondary circuit board 54 can be, for example, a thin film circuit board. An area of the secondary circuit board 54 is substantially equal to a bottom area of the sensing switch 52, or can be slightly greater than or smaller than the bottom area of the sensing switch 52. The secondary circuit board 54 is connected to a main circuit board (not shown, which can be disposed in the main body 48 of the retaining bracket 40) through a cable (not shown). In other words, in the present disclosure, the whole main circuit board will not be moved during adjustment of the distance between the sensing switch 52 and the activating portion 122 of the button 21. Therefore, displacement of other elements (such as a scroll wheel and an optical sensing element) on the main circuit board can be prevented, so that assembling tolerances of other elements can be avoided. The sensing switch 52 has a plurality of solder pins 521, and the solder pins 521 pass through the secondary circuit board 54. The suspended arm 42 forms a plurality of pin holes 420, and the solder pins 521 pass through the pin holes 420, respectively.

Figure 5:
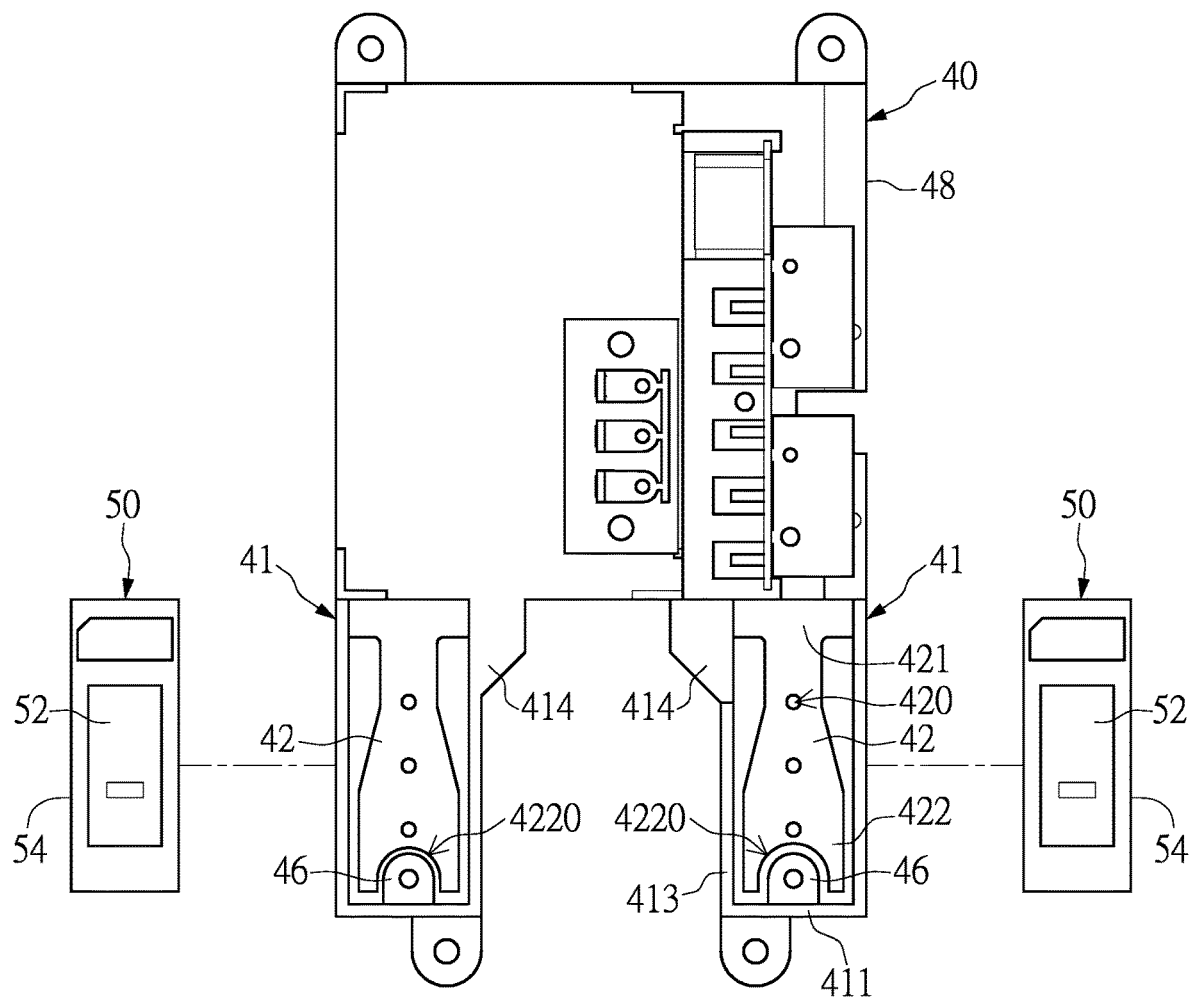
FIG. 5 is an exploded top view of a retaining bracket and a sensing switch module according to the present disclosure.
Figure 6:
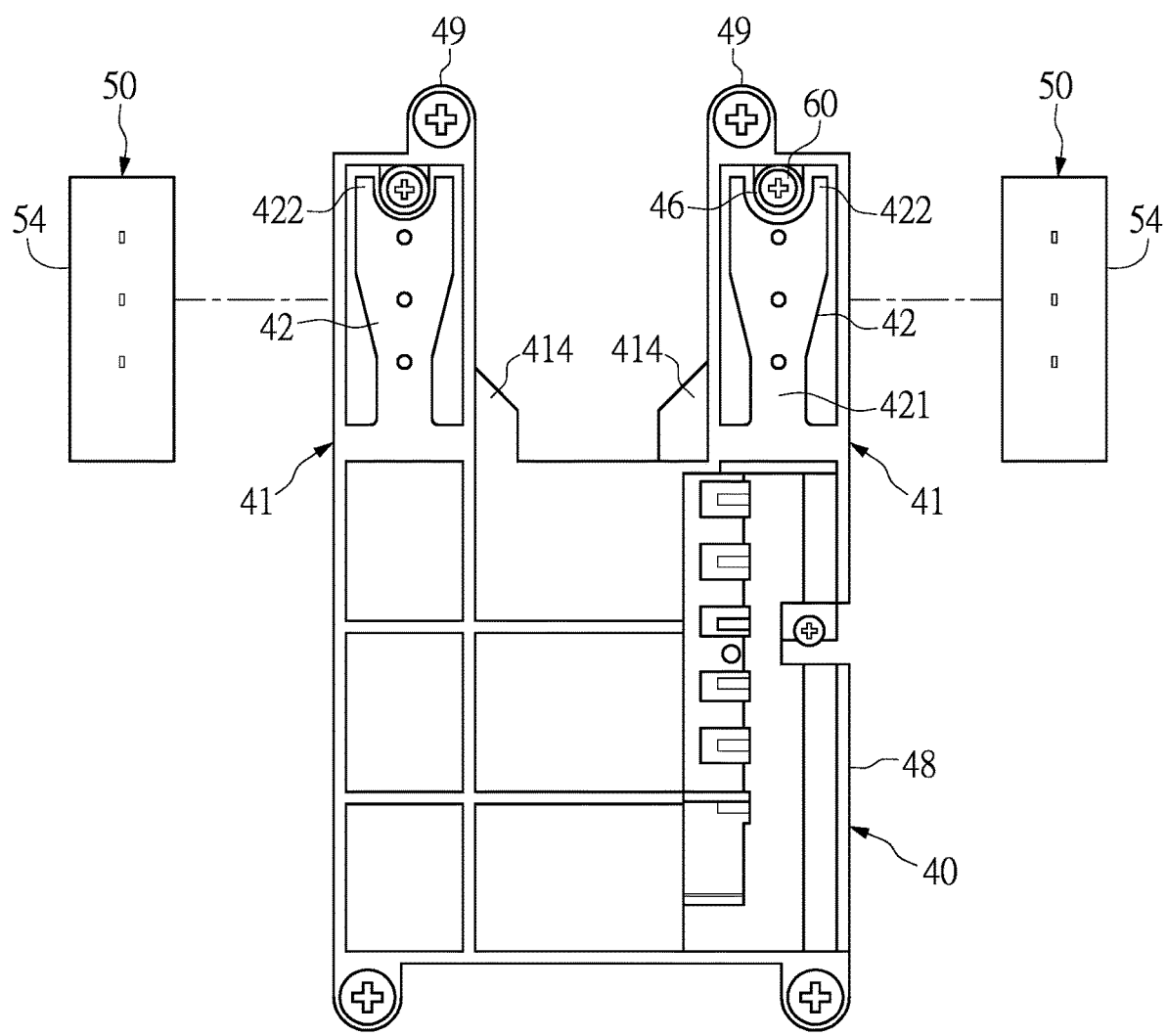
FIG. 6 is an exploded bottom view of the retaining bracket and the sensing switch module according to the present disclosure.
Figure 7:
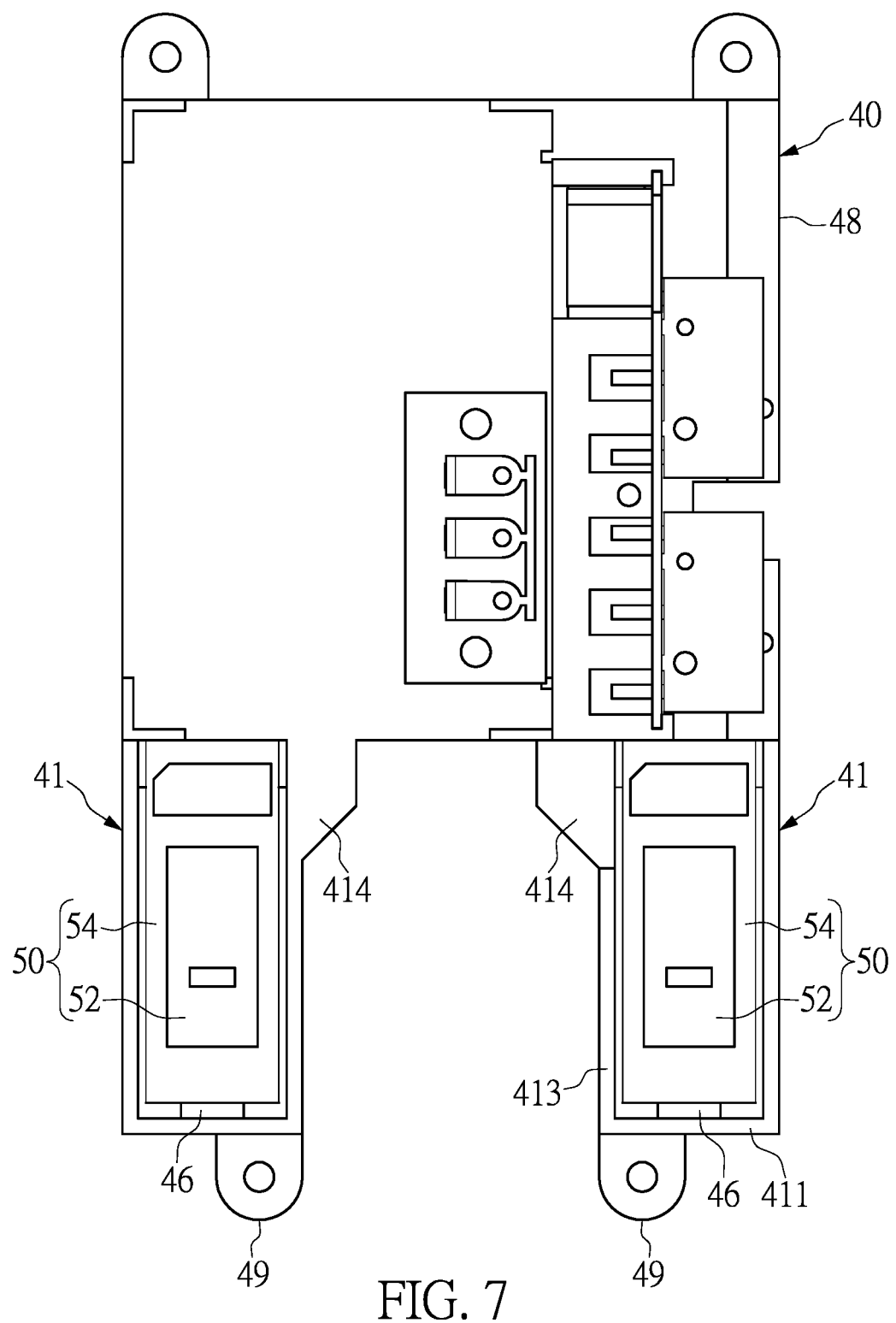
FIG. 7 is an assembled top view of the retaining bracket and the sensing switch module according to the present disclosure.

Referring to FIG. 5 to FIG. 7, the two frames 41 of the retaining bracket 40 are connected to the main body 48. Each frame 41 has a pair of side walls 413 and the front wall 411. The pair of side walls 413 connects to one side of the main body 48. The front wall 411 is opposite to the main body 48 and is connected to edges of the pair of side walls 413. The fixed end 421 of the suspended arm 42 is adjacent to the main body 48, and is connected to the pair of side walls 413 and the main body 48. The free end 422 of the suspended arm 42 is adjacent to the front wall 411. In this embodiment, the fixed end 421 is substantially I-shaped, and the free end 422 is fork-shaped. The suspended arm 42 is gradually tapered from the free end 422 toward the fixed end 421. The suspended arm 42 is substantially Y-shaped. Therefore, the free end 422 of the suspended arm 42 can be elastically moved in the frame 41.

In this embodiment, the free end 422 of the suspended arm 42 is fork-shaped and forms a notch 4220. The threaded tube 46 extends into the notch 4220. As shown in FIG. 4, the secondary circuit board 54 extends to cover the notch 4220 and the threaded tube 46. In other words, when the adjusting screw 60 is being rotated, the adjusting screw 60 can protrude from the top surface of the threaded tube 46 and abuts against a bottom surface of the secondary circuit board 54 of the sensing switch module 50, so that the sensing switch module 50 is pushed upward and the activating portion 122 of the button 12 can accurately contact an activating point of the sensing switch 52. In other words, the distance D can be reduced to zero, so as to prevent the button 12 from generating an idle keystroke.

In addition, the frame 41 further includes a reinforcing plate 414. The reinforcing plate 414 extends from one of the side walls 413 and is connected to the main body 48. In this way, the stability and rigidity of the frame 41 can be strengthened, and the frame 41 is not easily deformed.

Referring to FIG. 1 to FIG. 8, one embodiment of the present disclosure provides a method for assembling and adjusting a mouse device, which includes at least steps as follows.

The middle housing 20 is assembled to the upper housing 10. The upper housing 10 includes the button 12. Each button 12 has the activating portion 122 extending downward from a bottom surface of the button 12. The activating portion 122 passes through the middle housing 20 and extends to abut against the sensing switch module 50.

The two sensing switch modules 50 are fixed to the retaining bracket 40 by use of, for example, an adhesive. In detail, the retaining bracket 40 has the two frames 41, and each of the frames 41 receives one of the sensing switch modules 50. The suspended arm 42 is formed at a bottom portion of each frame 41. The fixed end 421 is configured at one end of the suspended arm 42, and the fixed end 421 is connected to one side of the frame 41. The free end 422 is configured at another end of the suspended arm 42 and can move elastically.

The retaining bracket 40 is fixed to the middle housing 20. In detail, by the four screws S1, the retaining bracket 40 is screwed to the connecting posts 241, 242 beneath the middle housing 20. After the retaining bracket 40 is assembled, the subsequent adjustment step allows the activating portion 122 to accurately contact the sensing switch module 50.

The adjusting screw 60 is disposed at one side of the frame 41. The adjusting screw 60 is adjacent to the free end 422 of the suspended arm 42. In detail, the retaining bracket 40 further includes the threaded tube 46. The threaded tube 46 is connected to the bottom portion of the front wall 411 of the frame 41. The adjusting screw 60 passes through the threaded tube 46. The top surface of the threaded tube 46 is flush with the top surface of the suspended arm 42, or is lower than the top surface of the suspended arm 42.

By rotating the adjusting screw 60, the distance D between the sensing switch module 50 and the button 12 can be adjusted. In detail, the sensing switch module 50 includes the sensing switch 52 and the secondary circuit board 54. The adjusting screw 60 can push the secondary circuit board 54 upward or downward, so that the sensing switch 52 moves upward to be close to the activating portion 122 of the button 12 or moves downward to depart from the activating portion 122 of the button 12. After the adjustment, the sensing switch 52 can just abut against the activating portion 122 of the button 12.

Finally, the bottom housing 30 is placed onto the middle housing 20, so as to complete the process for assembling and adjusting the mouse device. In addition, the adjusting screw 60 is not exposed from the bottom housing 30.

Beneficial Effects of the Embodiment

In conclusion, one of the beneficial effects of the present disclosure is that, in the mouse device and the method for assembling and adjusting the same provided by the present disclosure, the bottom housing 30 is assembled after the distance between the sensing switch 52 and the activating portion 122 of the button 12 is adjusted. The bottom housing 30 of this embodiment does not need an opening for adjustment. In addition, the secondary circuit board 54 is disposed at a bottom of the sensing switch 52, and is separate from the main circuit board (not shown). The main circuit board does not need to be moved during the adjusting process, such that displacement of other elements can be prevented. In the present disclosure, the retaining bracket 40 is used as a stable foundation. The suspended arm 42 at the bottom portion of the frame 41 provides a proper elastic deformation, and provides an upward elastic force to the button 12 after the button 12 is pressed.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A mouse device, comprising:
   an upper housing including a button;
   a bottom housing;
   a middle housing disposed between the upper housing and the bottom housing;
   a retaining bracket disposed under the middle housing, the retaining bracket including a frame and a suspended arm, the suspended arm having a fixed end, and the fixed end being fixedly connected to one side of the frame;
   a sensing switch module disposed on the suspended arm, wherein the sensing switch module corresponds in position to the button, and one part of the sensing switch module extends beyond a free end of the suspended arm; and
   an adjusting screw disposed at another side of the frame and being adjacent to the free end of the suspended arm, wherein the adjusting screw is shielded by the bottom housing and is not exposed from a bottom side of the bottom housing, and the adjusting screw abuts against the sensing switch module, so as to allow for adjustment of a distance between the sensing switch module and the button.

2. The mouse device according to claim 1, wherein the sensing switch module includes a sensing switch and a secondary circuit board, the sensing switch is disposed on the secondary circuit board, the secondary circuit board is disposed in the frame, and the secondary circuit board is electrically connected to a main circuit board by a cable.

3. The mouse device according to claim 2, wherein the sensing switch includes a plurality of solder pins, the solder pins pass through the secondary circuit board, a plurality of pin holes are formed on the suspended arm, and the solder pins pass through the pin holes, respectively.

4. The mouse device according to claim 2, wherein the retaining bracket includes a main body, the frame has a pair of side walls and a front wall, the pair of side walls are connected to one side of the main body, and the front wall is opposite to the main body and connected to an end edge of the pair of side walls; wherein the fixed end of the suspended arm is adjacent to the main body and connected to the pair of side walls, and the free end of the suspended arm is adjacent to the front wall.

5. The mouse device according to claim 4, wherein the retaining bracket further includes a threaded tube, the threaded tube is connected to a bottom portion of the front wall of the frame, and the adjusting screw passes through the threaded tube; wherein a top surface of the threaded tube is flush with a top surface of the suspended arm, or is lower than the top surface of the suspended arm.

6. The mouse device according to claim 5, wherein the free end of the suspended arm is fork-shaped and forms a notch, the threaded tube extends into the notch, and the secondary circuit board extends and covers the notch and the threaded tube.

7. The mouse device according to claim 6, wherein the suspended arm is gradually tapered from the free end toward the fixed end.

8. The mouse device according to claim 4, wherein the frame further includes a coupling threaded tube, and wherein the coupling threaded tube is connected to an outer surface of the front wall and is connected to the middle housing by a fixing screw.

9. The mouse device according to claim 4, wherein the frame further includes a reinforcing plate, and the reinforcing plate extends from one of the side walls and is connected to the main body.

10. A method for assembling and adjusting a mouse device, comprising steps as follows:
    assembling a middle housing to an upper housing, the upper housing including a button;
    fixing a sensing switch module to a retaining bracket, wherein the retaining bracket includes a frame and a suspended arm, and one end of the suspended arm is connected to one side of the frame;
    fixing the retaining bracket to the middle housing;
    arranging an adjusting screw at another side of the frame;
    adjusting a distance between the sensing switch module and the button through the adjusting screw; and
    placing a bottom housing onto the middle housing, wherein the adjusting screw is not exposed from the bottom housing.

* * * * *